United States Patent
Alpman et al.

(10) Patent No.: US 10,111,173 B2
(45) Date of Patent: Oct. 23, 2018

(54) FULLY INTEGRATED WAKE-UP RECEIVER

(71) Applicant: INTEL CORPORATION, Santa Clara, CA (US)

(72) Inventors: Erkan Alpman, Portland, OR (US); Ahmad B. Khairi, Hillsboro, OR (US); Stefano Pellerano, Beaverton, OR (US); Ashoke Ravi, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/164,667

(22) Filed: May 25, 2016

(65) Prior Publication Data

US 2016/0374021 A1    Dec. 22, 2016

Related U.S. Application Data

(60) Provisional application No. 62/182,086, filed on Jun. 19, 2015.

(51) Int. Cl.
*H04B 1/16* (2006.01)
*H04W 52/02* (2009.01)

(52) U.S. Cl.
CPC ......... *H04W 52/0229* (2013.01); *Y02D 70/00* (2018.01); *Y02D 70/1224* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/168* (2018.01); *Y02D 70/21* (2018.01); *Y02D 70/22* (2018.01); *Y02D 70/26* (2018.01)

(58) Field of Classification Search
CPC ... H04B 1/30; H04B 1/28; H04B 1/18; H03D 7/00; H03D 7/1441; H03D 7/1433; H04W 52/02; H04W 52/0229; H04W 52/0225; H04W 52/0216
USPC ............................. 455/255–260, 323, 343.2
See application file for complete search history.

(56) References Cited

U.S. PATENT DOCUMENTS

| | | | | |
|---|---|---|---|---|
| 4,716,375 A | * | 12/1987 | van Roermund | H03D 1/22 327/2 |
| 8,164,380 B2 | * | 4/2012 | Hosokawa | H03D 7/1441 327/355 |
| 2009/0109091 A1 | * | 4/2009 | Thind | G01S 19/24 342/357.63 |
| 2010/0056097 A1 | * | 3/2010 | Liebman | H04W 52/028 455/341 |

* cited by examiner

*Primary Examiner* — Nhan Le
(74) *Attorney, Agent, or Firm* — Green, Howard & Mughal LLP

(57) ABSTRACT

An apparatus is provided which comprises: a mixer to mix a first signal of a first frequency with a second signal of a second frequency, and to generate a first output; a switched-capacitor multiplier, coupled to the mixer, to receive the first output and to provide a second output with reduced noise; and an amplifier, coupled to the switched-capacitor multiplier, to amplify the second output.

12 Claims, 14 Drawing Sheets

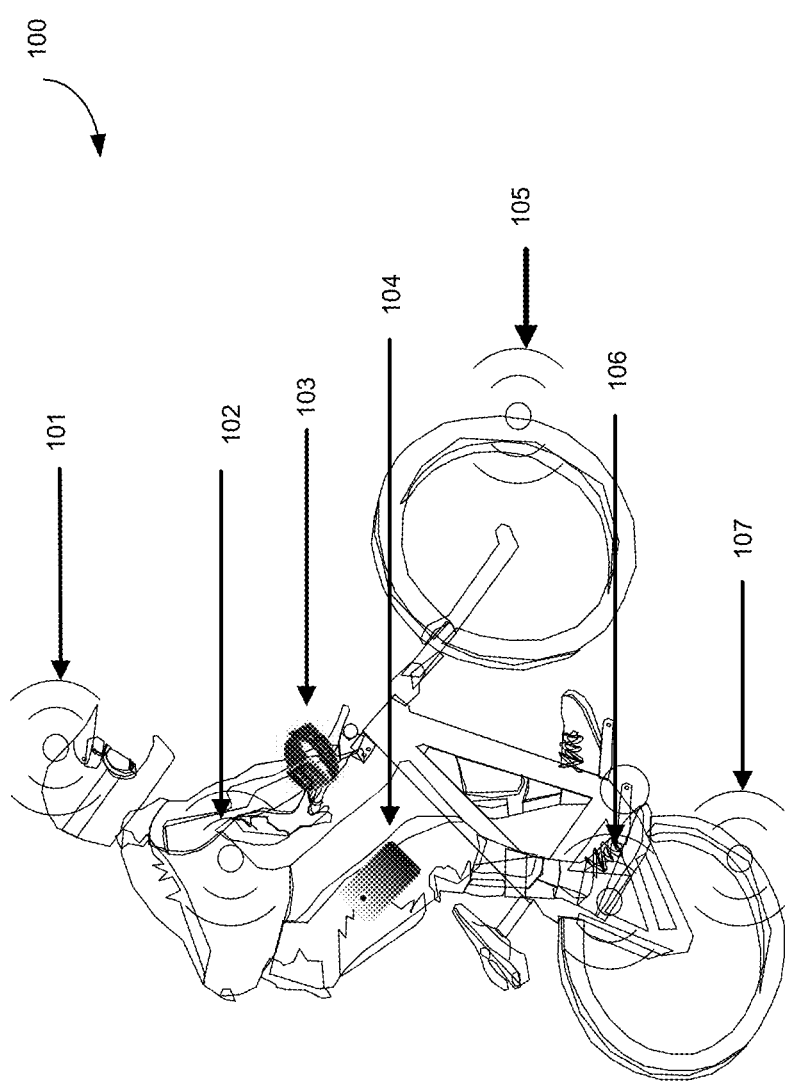

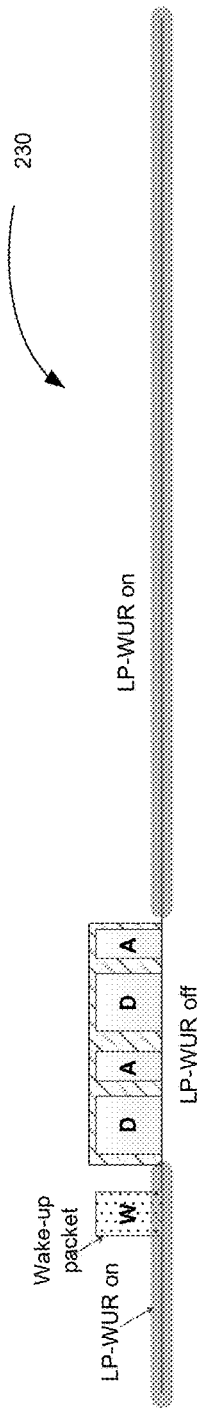
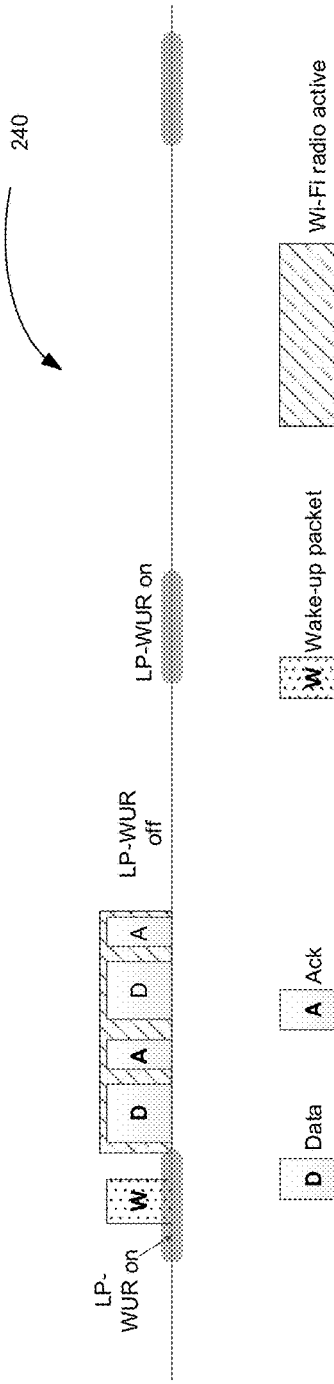

FULLY INTEGRATED WAKE-UP RECEIVER

CLAIM FOR PRIORITY

This application claims priority to U.S. Provisional Patent Application Ser. No. 62/182,086, filed on 19 Jun. 2015, titled "FULLY INTEGRATED WAKE-UP RECEIVER," and which is incorporated by reference in its entirety.

BACKGROUND

Power consumption is a major problem in today's wireless systems. Although performance of wireless systems is constantly improving due to increasing demand on higher data rates and additional functionality, power dissipation remains a concern as form factors of such wireless systems get smaller. Enhancing battery life of these wireless systems is also a challenge because as performance of wireless systems improves, there is generally more burden on battery usage. There also exists a big power saving push for very low power applications such as wireless sensor nodes (which are becoming increasingly popular). Wireless sensor nodes rely on very small form factor batteries (or no battery at all) while maintaining functionality for extensive periods of time.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 1 illustrates an ensemble of wearable devices including a fully integrated Wake-up Receiver, according to some embodiments of the disclosure.

FIG. 2C illustrates a timeline of processing a wake-up packet and data packet using an always-on Wake-up Receiver, according to some embodiments of the disclosure.

FIG. 2D illustrates a timeline of processing a wake-up packet and data packet using a Wake-up Receiver which is normally off and turned on to process a wake-up packet, according to some embodiments of the disclosure.

DETAILED DESCRIPTION

Figure 2A:
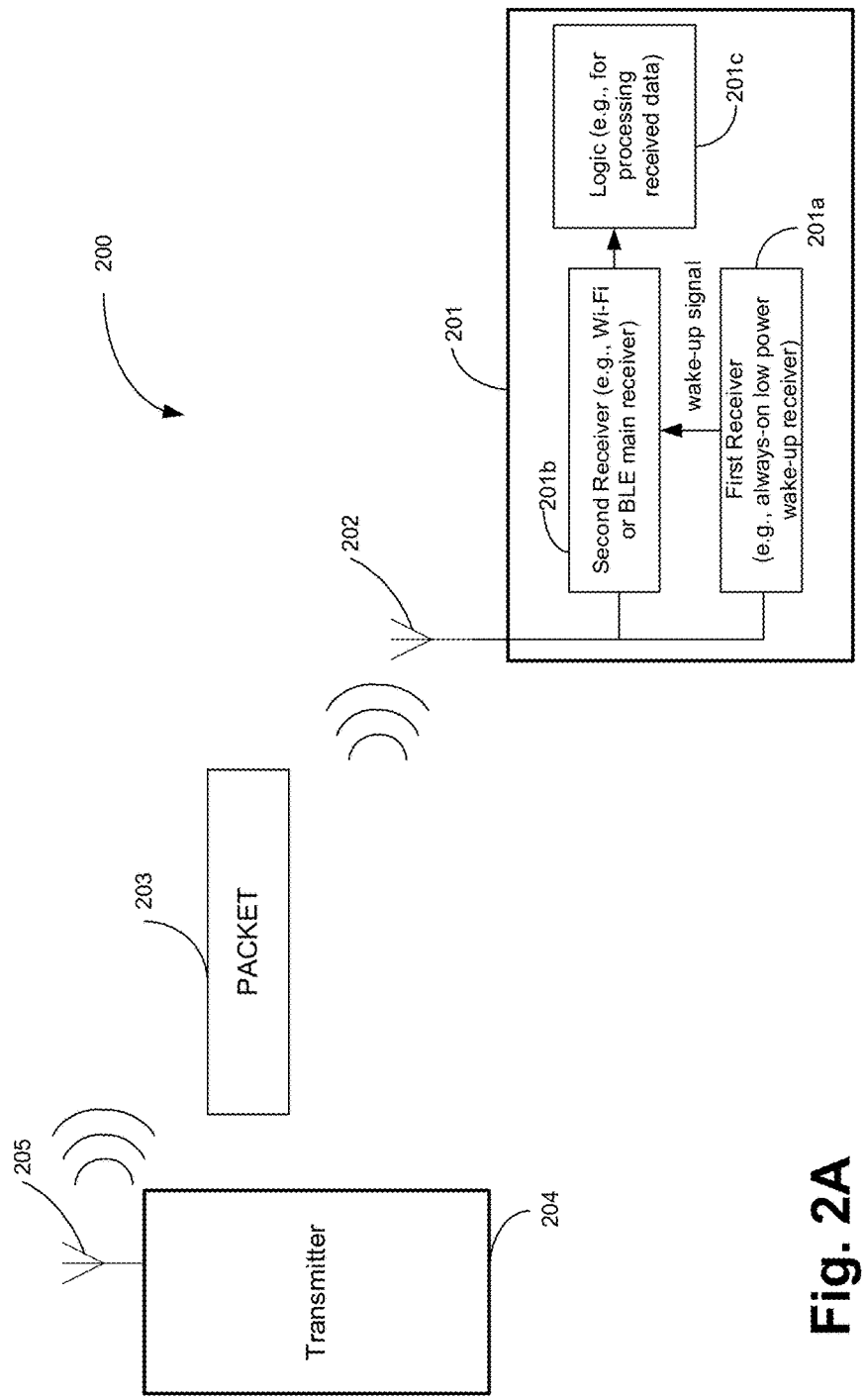
FIG. 2A illustrates a system level architecture showing the principle of operation of a fully integrated Wake-up Receiver, according to some embodiments of the disclosure.

The most common power saving mechanism in wireless systems is achieved through power cycling a main radio. A main radio is the receiver in the wireless system that receives incoming RF (radio frequency) data. The main radio is generally one of the high power consuming circuits of a wireless system. One way to reduce power of a wireless system is to reduce energy consumption of the main radio. However, low energy consumption and low latency are two conflicting goals in duty-cycled wireless systems. Aggressive power saving is possible by keeping the main radio in the sleep mode for a long period of time but it creates more latency in the communication or the communication can be lost completely.

Wake-up Receivers can break the power-latency dilemma of the main radio in an effective manner. A wake-up receiver is an always-on, always-listening device whose main function is to sense a "wake-up" signal and turn the main radio on when needed. A very power efficient scheme can be obtained this way as the main radio can be kept in a sleep mode almost all the time except when it needs to operate. Thus, latency can be kept at its minimum value while 10 to 100 times power saving can be achieved in the main radio. On the other hand, wake-up receivers should be extremely low-power to make this scheme feasible because of their always-on, always listening nature.

Existing wake-up receivers suffer from the necessity of external High-Q (high quality) components such as Surface Acoustic Wave (SAW) and Bulk Acoustic Wave (BAW) filters or off-chip inductors. These filters are generally bulky and expensive components limiting the form factor of wireless system and increasing the cost of integration. Existing wake-up receivers also suffer from the necessity of crystal oscillators to achieve a stable center frequency. These external crystal oscillators are also bulky which limits the form factor and also increases the cost and power dissipation. Additionally, existing wake-up receivers suffer from integration as they tend to be implemented in fairly old Complementary Metal Oxide Semiconductor (CMOS) processes (e.g., 65 nm and above). Existing wake-up receivers also suffer from undefined specifications and targets. Since there is no standard for wake-up receivers, various architectures with very poor sensitivity and poor interference rejection are currently being suggested. A standard compliant design is not common today.

To solve at least one or all of the above problems, in some embodiments, a fully-integrated ultra-low power wake-up receiver design is provided. In some embodiments, the wake-up receiver comprises a mixer, a switched-capacitor multiplier, and an amplifier. In some embodiments, the mixer is configured to mix a first signal of a first frequency with a second signal of a second frequency, and to generate a first output. In some embodiments, the mixer is a passive mixer. In some embodiments, the switched-capacitor multiplier is coupled to the mixer, and is operable to receive the first output and is to provide a second output with reduced noise. In some embodiments, the amplifier is coupled to the switched-capacitor multiplier, and is to amplify the second output. In some embodiments, the wake-up receiver comprises an impedance matching network having an impedance matched with an impedance of an antenna, where the impedance matching network is coupled to the mixer and is to provide the first signal to the mixer. In some embodiments, the wake-up receiver includes a clock source to provide the second signal to the mixer and is to provide a third signal of a third frequency to the switched-capacitor multiplier. The clock source can be one of a frequency locked loop (FLL), a phase locked loop (PLL), or a crystal.

In some embodiments, the wake-up receiver comprises a filter coupled to the amplifier, where the filter is to filter a portion of the second output to detect a wakeup signal. In some embodiments, the filter is integrated with the amplifier (e.g., it is not a separate component, but built-in as part of the amplifier). In some embodiments, the wake-up receiver comprises an analog-to-digital converter (ADC) which is coupled to the filter, where the ADC is to convert the filtered portion of the second output to a digital representation. This digital representation may be used to wake-up another receiver which then processes the incoming wireless signal. In some embodiments, the wake-up receiver comprises: an envelope detector coupled to the ADC; a digital decimator and accumulator coupled to the envelope detector; and a decision circuit coupled to the digital decimator and accumulator, where the decision circuit is to generate a control signal according to whether a wakeup signal is detected. In some embodiments, the wake-up receiver comprises a low noise amplifier (LNA) coupled to the mixer, where the LNA is to provide the first signal to the mixer.

In some embodiments, the fully-integrated ultra-low power wake-up receiver is compliant with the Institute of Electrical Engineers (IEEE) 802.11 legacy Wi-Fi standard (or any other wireless standard). In some embodiments, the fully-integrated ultra-low power wake-up receiver relies on no expensive, external high-Q components. In some embodiments, the fully-integrated ultra-low power wake-up receiver dissipates very low power (e.g., less than 100 µW (micro-Watt) of active power). In some embodiments, the fully-integrated ultra-low power wake-up receiver leverages the benefits of scaled-CMOS processes using switched-capacitor gain stages. Some embodiments leverage the benefits of the scaled CMOS process and enables System-on-Chip (SoC) integration for low power applications including cellular applications, seamless connectivity, and wireless sensor networks.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct physical, electrical, or wireless connection between the things that are connected, without any intermediary devices. The term "coupled" means either a direct electrical or wireless connection between the things that are connected or an indirect electrical or wireless connection through one or more passive or active intermediary devices. The term "circuit" means one or more passive and/or active components that are arranged to cooperate with one another to provide a desired function. The term "signal" means at least one current signal, voltage signal, magnetic signal, electromagnetic signal, or data/clock signal. The meaning of "a," "an," and "the" include plural references. The meaning of "in" includes "in" and "on."

The terms "substantially," "close," "approximately," "near," and "about," generally refer to being within +/−20% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

For purposes of the embodiments, the transistors in various circuits and logic blocks described here are metal oxide semiconductor (MOS) transistors, which include drain, source, gate, and bulk terminals. The transistors also include Tri-Gate and FinFET transistors, Gate All Around Cylindrical Transistors, Tunneling FET (TFET), Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

FIG. 1 illustrates ensemble 100 of wearable devices including a fully integrated wake-up receiver, according to some embodiments of the disclosure. In this example, ensemble 100 is on a person and his/her ride (here, a bicycle). However, the embodiments are not limited to such. Other scenarios of wearable devices and their usage may work with the various embodiments.

For example, the fully integrated wake-up receiver can be embedded into some other products (e.g., medical devices, ambulances, patient uniform, doctor's uniform, walls, etc.) and can be controlled using a controller or a terminal device. The apparatus with the fully integrated wake-up receiver of some embodiments can also be part of a wearable device. The term "wearable device" (or wearable computing device) generally refers to a device coupled to a person. For example, devices (such as sensors, cameras, speakers, microphones (mic), smartphones, smart watches, medical devices, etc.) which are directly attached on a person or on the person's clothing are within the scope of wearable devices.

In some examples, wearable computing devices may be powered by a main power supply such as an AC/DC power outlet. In some examples, wearable computing devices may be powered by a battery. In some examples, wearable computing devices may be powered by a specialized external source based on Near Field Communication (NFC). The specialized external source may provide an electromagnetic field that may be harvested by circuitry at the wearable computing device. Another way to power the wearable computing device is electromagnetic field associated with wireless communication, for example, WLAN (Wireless Local Area Network) transmissions. WLAN transmissions use far field radio communications that have a far greater range to power a wearable computing device than NFC transmission. WLAN transmissions are commonly used for wireless communications with most types of terminal computing devices.

For example, the WLAN transmissions may be used in accordance with one or more WLAN standards based on Carrier Sense Multiple Access with Collision Detection (CSMA/CD) such as those promulgated by the IEEE. These WLAN standards may be based on CSMA/CD wireless technologies such as Wi-Fi™ and may include Ethernet wireless standards (including progenies and variants) associated with the IEEE 802.11-2012 Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11").

Continuing with the example of FIG. 1, ensemble 100 of wearable devices includes device 101 (e.g., camera, microphone, etc.) on a helmet, device 102 (e.g., an apparatus with the fully integrated wake-up receiver) on the person's arm, device 103 (e.g., a smart watch that can function as a terminal device, controller, or a device to be controlled), device 104 (e.g., a smart phone and/or tablet in a pocket of the person's clothing), device 105 (e.g., pressure sensor to sense or measure pressure of a tire, or gas sensor to sense nitrogen air leaking from the tire), device 106 (e.g., an accelerometer to measure paddling speed), device 107 (e.g., another pressure sensor for the other tire). In some embodiments, ensemble 100 of wearable devices has the capability to communicate by wireless energy harvesting mechanisms or other types of wireless transmission mechanisms.

In some embodiments, device 102 with the fully integrated wake-up receiver includes an antenna to transmit data to a controller or a terminal device (e.g., a smart phone, laptop, cloud, etc.) for further processing. In some embodiments, the antenna may comprise one or more directional or omnidirectional antennas, including monopole antennas, dipole antennas, loop antennas, patch antennas, microstrip antennas, coplanar wave antennas, or other types of antennas suitable for transmission of Radio Frequency (RF) signals. In some multiple-input multiple-output (MIMO) embodiments, the antennas are separated to take advantage of spatial diversity.

In some embodiments, an always-on, always listening, ultra-low power wake-up receiver is provided (e.g., in wearable device 102) to reduce the power dissipation of the main radio (Wi-Fi, Bluetooth (BT), BTLE (BT Low Energy), LTE (Long Term Evolution), etc.) by keeping it in the sleep mode (i.e., OFF mode) except when there is a need for the operation. As such, the main radio transceiver can be kept off as long as possible. In some embodiments, power saving is achieved without sacrificing from latency or communication losses.

In some embodiments, a wake-up signal is embedded in an existing protocol of the wireless standard of consideration, and this wake-up signal can be utilized to send a wake-up notice. In some embodiments, the wake-up receiver is mainly responsible for demodulating this wake-up signal and sending a command to the main radio to wake-up from its sleep mode. In some embodiments, this wake-up receiver may not need to support high data rates, or complex modulation schemes. As such, a very low-power architecture is feasible.

The embodiments are not limited to wearable devices, but can be part of any mobile device. For example, the embodiments can be part of communication systems such as Internet-of-Things (IoT), device-to-device (D2D), machine-to-machine (M2M), machine type communication (MTC), mobile phones, tablets, etc.

FIG. 2A illustrates a system level architecture 200 showing the principle of operation of a fully integrated wake-up receiver, according to some embodiments of the disclosure. In some embodiments, architecture 200 comprises receiver 201 and transmitter 204. In some embodiments, receiver 201 and transmitter 204 may be part of their respective transceivers. Receiver 201 and transmitter 204 may generally be referred to as wireless devices. In this example, transmitter 204 transmits wirelessly a packet 203 to receiver 201. In some embodiments, receiver 201 comprises first receiver 201a, second receiver 201b, logic 201c, and antenna 202. A person skilled in the art would appreciate that a simplified form receiver 201 is illustrated so as not to obscure the various embodiments. In some embodiments, both transmitter 204 and receiver 201 are wireless devices that may communicate with one another by transmitting and receiving data wirelessly.

In some embodiments, first receiver 201a is an always-on low power wake-up receiver which is capable to detect for the presence/absence of a wake-up signal in packet 203. In some embodiments, first receiver 201a meets the specifications listed in Table 1.

TABLE 1

| Symbol rate | 250 KSps (OOK (on-off keying) over OFDM (orthogonal frequency division multiplexing)) |
|---|---|
| Bandwidth (BW) | 4 MHz |
| Adjacent Channel Interference (ACI) rejection | +16 dBr at minimum sensitivity |
| Power | 50 µW |
| Sensitivity | −82 dBm |
| Noise Figure | 22 dB |

So as not to obscure the embodiments, first receiver 201a is described to be a Wi-Fi compliant receiver. In some embodiments, a modulation scheme is selected as OOK (on-off keying) due to its power efficiency, but the OFDM (Orthogonal Frequency Division Multiplexing) nature of the signal is conserved in order to be compatible with the existing transmitters. However, the embodiments are not limited to the above specification. Other standardized specifications may be used to implement a low lower always-on first receiver 201a.

In some embodiments, when first receiver 201a detects a wakeup indication in packet 203, it generates a wake-up signal to wake-up second receiver 201b. In some embodiments, second receiver 201b is the main receiver (or main radio) which decodes the Wi-Fi data in Packet 203. To keep power consumption of wireless device 201 low, second receiver 201b is normally in an off-state (or sleep mode), and is woken up by first receiver 201a when data is received by antenna 202. In some embodiments, second receiver 201b is any suitable receiver which can be turned on/off. In some embodiments, the output from second receiver 201b is received by Logic 201c (e.g., a processor), where it is processed. In some embodiments, the output from second receiver 201b is sent out to another device (not shown) for further processing.

In some embodiments, wireless devices 201 and 204 have antennas that are configured to receive one or more packets 203. The term "antenna", as used here, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Figure 2B:
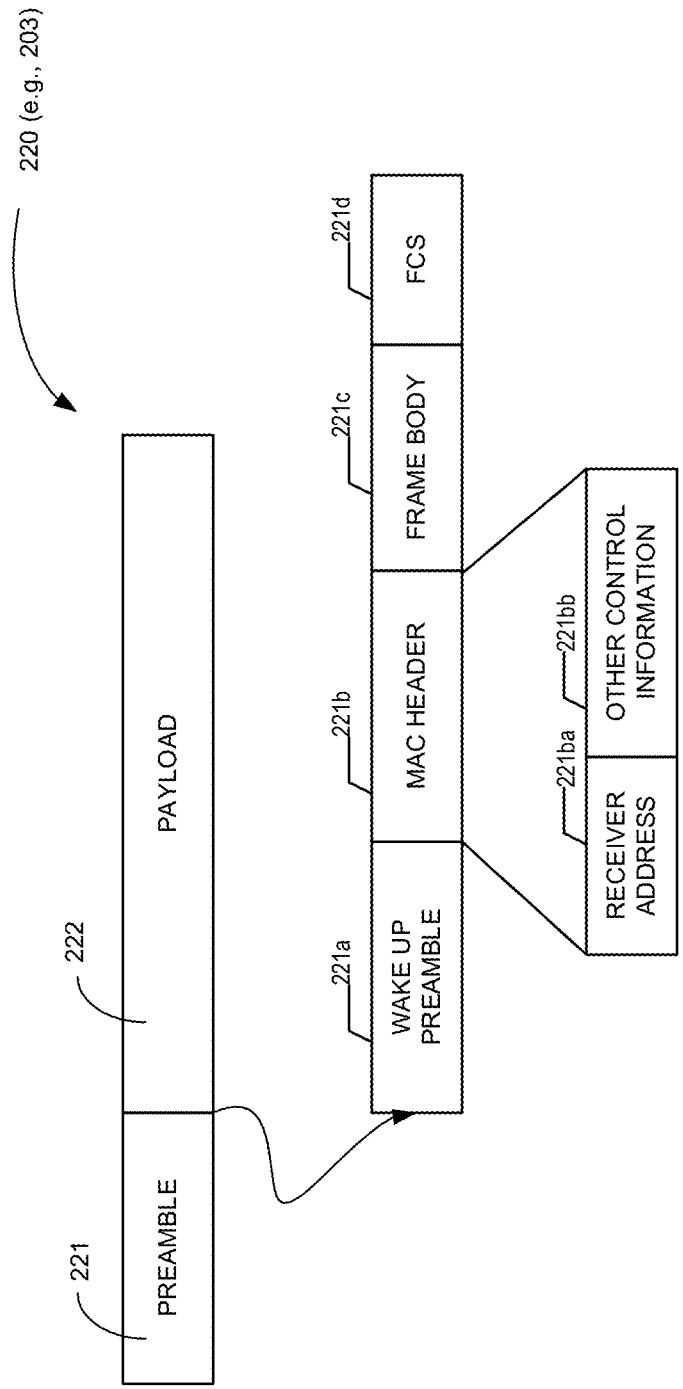
FIG. 2B illustrates a packet with a wake-up signal which is detected by the Wake-up Receiver, according to some embodiments of the disclosure.

FIG. 2B illustrates packet 220 (e.g., structure of packet 203) with a wake-up signal which is detected by the wake-up receiver, according to some embodiments of the disclosure. It is pointed out that those elements of FIG. 2B having the same reference numbers (or names) as the elements of any other figure can operate or function in any manner similar to that described, but are not limited to such. In some embodiments, packet 220 includes two parts; IEEE 802.11 compliant preamble 221; and the payload field 222. In some embodiments, payload field 222 is received by two different wireless receivers for different purposes. This payload field 222 can be processed by a wireless receiver without a wake-up receiver (e.g., legacy receiver) and by a wireless receiver with a wake-up receiver.

In some embodiments, when a wireless receiver has a main radio (e.g., Second Receiver 201b) and a wake-up radio (e.g., First Receiver 201a), wake-up radio 201a decodes the embedded wake-up signal in the received packet 220. Here, packet 220 may be an OFDM packet for a Wi-Fi communication case with the wake-up signal being embedded inside this OFDM packet, and where the modulation scheme is OOK modulation.

In some embodiments, one of the wireless receivers does not have a wakeup receiver and has its IEEE 802.11 compliant main radio on, and decodes the received packet as an OFDM modulated packet. For example, when a wireless receiver does not have a wake-up radio (e.g., when the receiver is a legacy receiver), the received wake-up signal is ignored by the wireless receiver because the receiver is not capable of decoding that wake-up signal. In this case, the remaining OFDM packet is decoded by the wireless receiver. As such, the legacy receiver continues to operate using existing communication protocol without being disturbed.

In some embodiments, preamble 221 includes Wake-up Preamble field 221a, Media Access Control (MAC) Header field 221b, Frame Body 221c, and frame check sequence (FCS) field 221d. In some embodiments, Wake-up Preamble field 221 identifies the beginning of the wake-up communication for first receiver 201a. In some embodiments, MAC Header field 221b may include a receiver address (RA) field 221ba and other control information fields 221bb which may include frame control, duration, sequence control information, and the like. In some embodiments, Frame Body field 221c may include information specific to the frame type and subtype. In some embodiments, FCS field 221d may be any frame check sequence, for example, a 32-bit cyclic redundancy code (CRC).

While the various embodiments are described with reference to Wi-Fi communication scheme that typically uses OFDM packet as its main packet, the embodiments are not limited to Wi-Fi communication scheme and/or OFDM packets. For example, other communication standards that may use OFDM or other schemes may be used without changing the essence of the embodiments.

FIG. 2C illustrates timeline 230 of processing a wake-up packet and data packet using an always-on Wake-up Receiver, according to some embodiments of the disclosure. In this example, Wake-up Receiver 201a is always powered-on and listening for an upcoming wake-up packet (W). Once the wake-up packet 'W' is identified, the Wake-up Receiver informs the main radio (e.g., second receiver 201b) to turn-on (e.g., wake-up from its sleep state) and process data in packet 220. In some embodiments, when or after a predetermined time following the wake-up of second receiver 201b, Wake-up Receiver 201a turns off and remains powered off till the last acknowledgement (A) is transmitted back to transmitter 204. During the time second receiver 201b is powered on, second receiver 201b processes data 'D' and sends acknowledgement 'A' after processing the data 'D'. In some embodiments, when the last acknowledgement 'A' is transmitted back to transmitter 204, second receiver 201b (e.g., Wi-Fi radio) is deactivated (e.g., powered down), and Wake-up Receiver 201a is powered back on to listen for any upcoming wake-up packet.

FIG. 2D illustrates timeline 240 of processing a wake-up packet and data packet using a Wake-up Receiver which is normally off and turned on to process a wake-up packet, according to some embodiments of the disclosure. Compared to timeline 230 of FIG. 2C, here Wake-up Receiver 201a is operable to turn on for merely processing the wake-up packet and to turn on the main radio (e.g., second receiver 201b) and then it turns itself off. Timeline 240 illustrates Wake-up Receiver 201a operating as a duty-cycling receiver to save more power in accordance with some embodiments. For example, when receiver 201 knows that the wake-up signal comes during certain times then instead of keeping First Receiver 201a always-listening/always-on, receiver 201 causes First Receiver 201a to be turned off during time periods when there is no data traffic on the communication channel.

Figure 3:
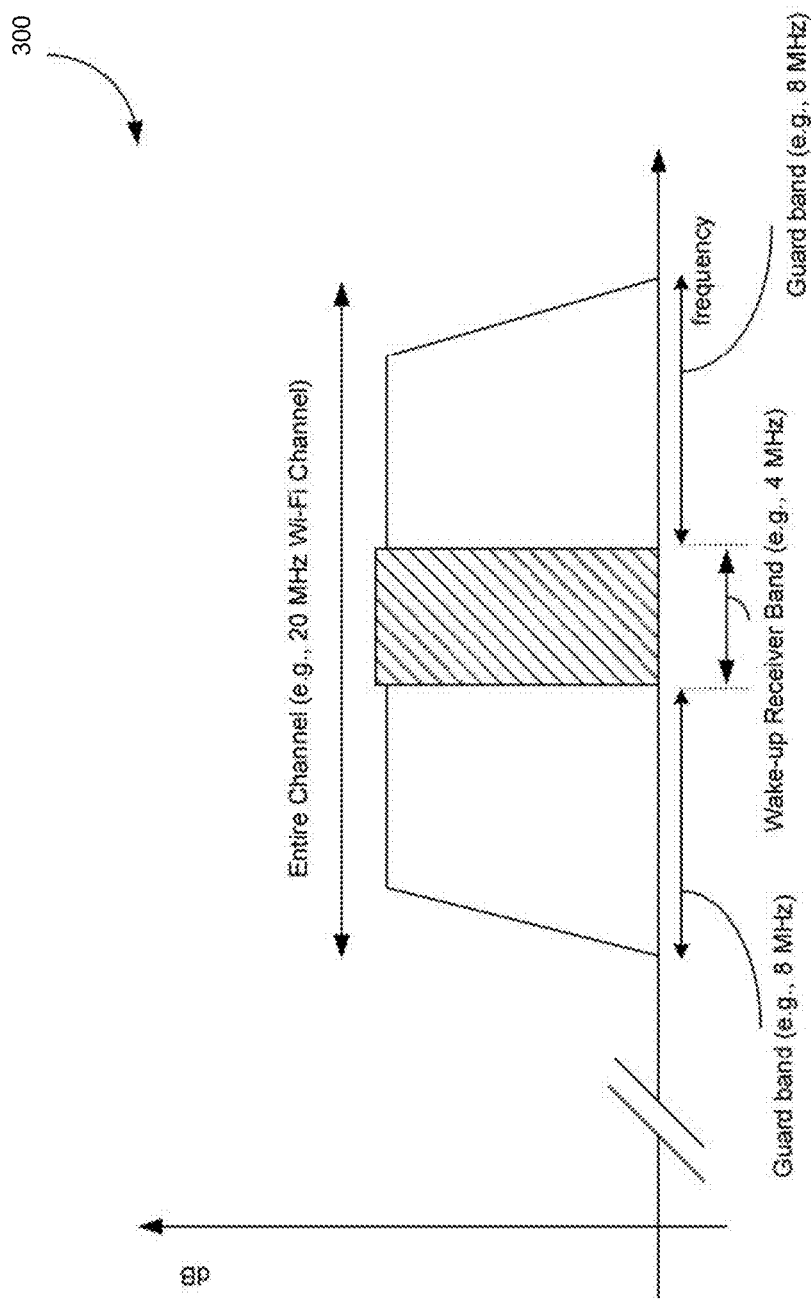
FIG. 3 illustrates a plot showing the allocation of the Wake-up Receiver band in a typical Wi-Fi channel, according to some embodiments of the disclosure.

FIG. 3 illustrates plot 300 showing the allocation of the Wake-up Receiver band in a typical Wi-Fi channel, according to some embodiments of the disclosure. Here 'x' axis is frequency and 'y' axis is magnitude. In some embodiments, transmitter 204 allocates an entire bandwidth (e.g., 20 MHz) during transmission, and uses a small portion of it (e.g., 4 MHz) for the wake-up signal. As such, guard bands around the wake-up signal are created which relaxes the interference rejection performance of Wake-up Receiver 201a, in accordance with some embodiments.

In some embodiments, the bandwidth of first receiver 201a is lower than the bandwidth of second receiver 201b. For example, first receiver 201a is tuned to have a bandwidth of 4 MHz while second receiver 201b is tuned to have a bandwidth of 20 MHz because first receiver 201a is interested in filtering out the wake-up while second receiver 201b is interested in filtering the contents of the entire Wi-Fi channel. In some embodiments, the low bandwidth for first receiver 201a (compared to the bandwidth of second receiver 201b) is achieved by activating a certain number of the subcarriers in the center of the entire Wi-Fi band. For example, a subcarrier away from the edges of the Wi-Fi channel can be reserved for carrying the wake-up signal such that there is enough frequency guard band on either sides of the subcarrier to make for a simpler low power wake-up receiver 201a. The frequency guard band on either sides of the subcarrier also allows for using a simpler modulation scheme compared to Quadrature Amplitude Modulation (QAM) 16/64/256, for example.

In some embodiments, the closest in-band Wi-Fi blocker signal can be no closer than a predetermined frequency (e.g., 8 MHz) to the wake-up signal. Some embodiments allow integration of such a transmission scheme without a special transmitter design. As such, in some embodiments, any existing Wi-Fi transmitter can support the transmission scheme without making any changes in the hardware. In some embodiments, wake-up signal can occupy an entire frequency band (e.g., entire Wi-Fi band) or just a fraction of the frequency band to create guard bands and to relax receiver specification.

Figure 4:
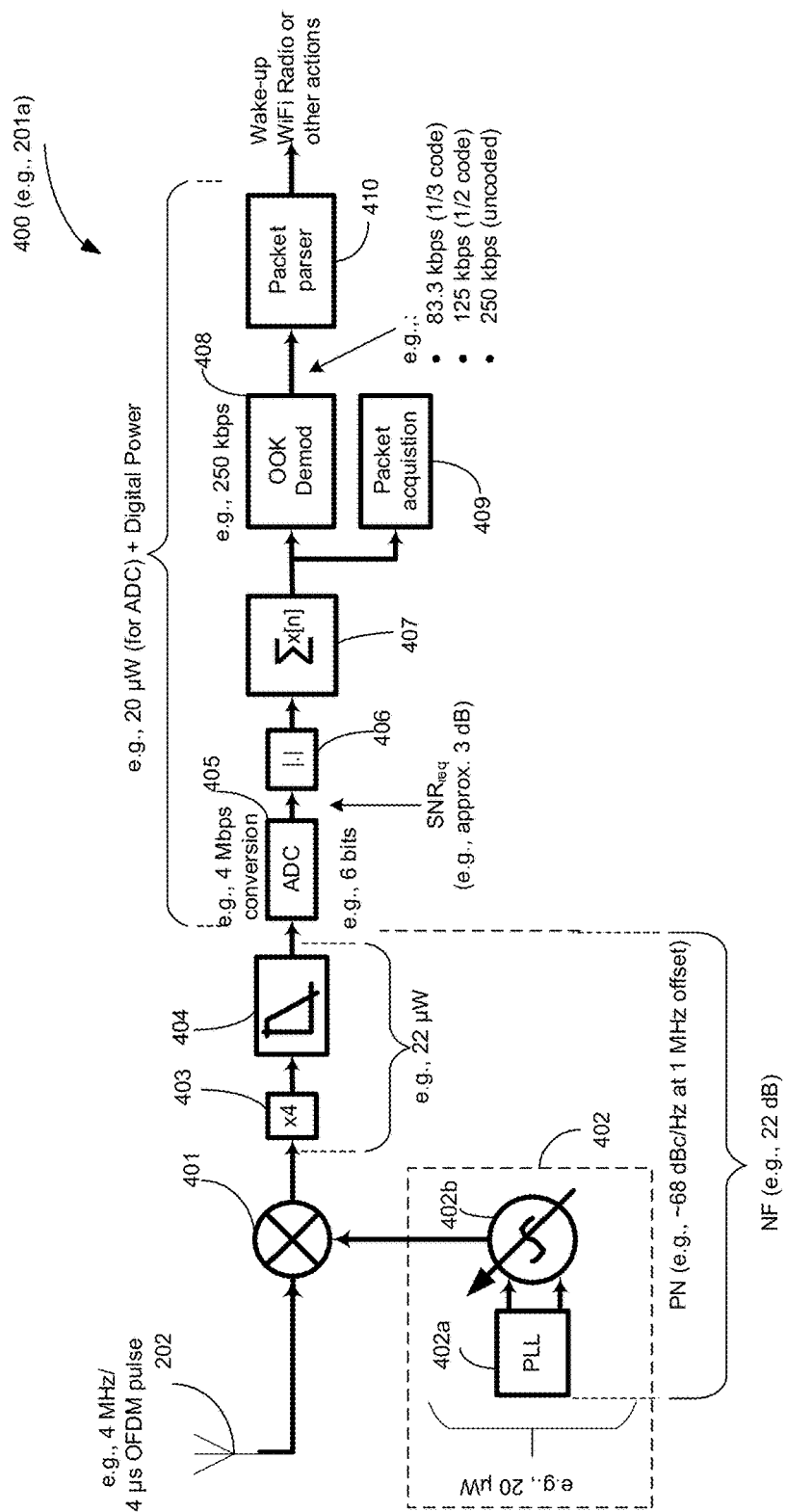
FIG. 4 illustrates a top level block diagram of mixer-first Wake-up Receiver, in accordance with some embodiments.

FIG. 4 illustrates a top level block diagram of a mixer-first Wake-up Receiver 400, in accordance with some embodiments. It is pointed out that those elements of FIG. 4 having the same reference numbers (or names) as the elements of any other figure can operate or function in any manner similar to that described, but are not limited to such.

In some embodiments, Wake-up Receiver 400 (e.g., first receiver 201a) comprises mixer 401 coupled to antenna 202, clock source 402, switched-capacitor multiplier 403, baseband filter 404, analog-to-digital converter 405, envelop detector 406, digital decimator 407, demodulator (Demod) 408, packet acquisition logic 409, and packet parser 410.

In some embodiments, mixer 401 is a passive mixer. One reason for using a passive filter topology is due to its superior flicker noise performance and zero static power dissipation. However the embodiments are not limited to a passive mixer. In some embodiments, an active mixer may be used to implement mixer 401. In some embodiments, mixer 401 uses both the positive and the negative phases of a driving clock which provides a gain of $4/\pi$ (e.g., roughly 2 dB).

In some embodiments, the driving clock for mixer 401 is generated by a starved ring oscillator based VCO (voltage controlled oscillator) 402b which leverages the benefits of the scaled CMOS process as it is composed of merely inverters coupled together in a ring. A ring oscillator can sustain stable oscillation while dissipating extremely low power. In some embodiments, coarse frequency control is achieved through resistive starvation of the inverters in VCO 402b which gives better flicker noise performance (than, for example, current-starved ring oscillators), thus lower phase noise. However, different frequency control schemes can also be applied without breaking the generality of the various embodiments. In some embodiments, LC (inductor-capacitor) oscillators are avoided as oscillators 402b because very high-Q inductors may be needed to maintain oscillation at very low power levels. However, various embodiments of Wake-up receiver 400 may use an LC oscillator as oscillator 402b when certain benefits of LC oscillators are desired.

In some embodiments, an analog PLL (Phase Locked Loop) 402a is included to minimize the frequency-deviation of ring-oscillator 402b. By this way, the center frequency of receiver 400 can be kept within reasonable limits to avoid unknown Intermediate Frequency (IF) based architectures and consequently the need of high-Q off-chip SAW/BAW based filters to filter out unwanted interferers. Although a PLL is presented in FIG. 4, the embodiments are not limited to this specific design choice. In some embodiments, a digital PLL or a simple frequency-locked loop (FLL) can be also utilized for PLL 402a. In some embodiments, the reference clock of the PLL is a 32 kHz RTC (real-time-clock) which exists in almost all platforms. As such, in some embodiments, a bulk crystal oscillator is avoided completely. In some embodiments, when certain benefits of a crystal oscillator are desired, a crystal oscillator may be used as a clocking source.

In some embodiments, a mixer-first architecture (such as the one of FIG. 4) is chosen to eliminate gain stages at the RF input. As such, in some embodiments, a low noise amplifier (LNA) is not used. However, the embodiments are not limited to LNA independent designs. In some embodiments, an LNA is added as the first stage such that the LNA (not shown) is coupled to antenna 202 and mixer 401. In one such embodiment, the output of the LNA is received as input to mixer 401.

In some embodiments, the first-gain stage, after mixer 401, is a switched-capacitor voltage multiplier 403 instead of a conventional active amplifier. In some embodiments, switched-capacitor voltage multiplier 403 is coupled to mixer 401. In some embodiments, by using switched-capacitor voltage multiplier 403, the link between noise and power dissipation is broken as the noise in a switched-capacitor circuit is defined to the first order by the size of its capacitors (kT/C). In some embodiments, with proper sizing of the capacitors of switched-capacitor voltage multiplier 403, Noise Figure (NF) is kept low without burning too much power.

In some embodiments, the gain of switched-capacitor voltage multiplier 403 suppresses the input-referred noise of the following amplifier stages and relaxes their power dissipation requirement. This technique also benefits highly from the scaled CMOS process as the quality of switches and the density of metal-finger capacitors improve constantly with scaling. In some embodiments, switched-capacitor voltage multiplier 403 can be removed when noise and power budgets are not met with a design having a switched-capacitor voltage multiplier.

In some embodiments, baseband filter 404 is coupled to the output of switched-capacitor voltage multiplier 403. In some embodiments, baseband filter 404 merely passes frequencies inside an interval (0, A), where 'A' is the maximum frequency of the signal. Any suitable baseband filter may be used to implement baseband filter 404. In this example, the noise figure (NF) of the clocking source 402, the switched-capacitor multiplier 403, and baseband filter 404 is about 22 dB, when 4 MHz bandwidth for wake-up signal is used, to be compliant with sensitivity requirements (e.g., −82 dBm) of the Wi-Fi standard. Here, the phase noise (PN) of the clocking source 402, the switched-capacitor multiplier 403, and baseband filter 404 is about 68 dBc/Hz at 1 MHz offset. However, these numbers can be different for a BTLE system.

In some embodiments, mixer 401 is configured to mix a first signal (e.g., 4 MHz/4 μs OFDM pulse received on antenna 202) of a first frequency with a second signal of a second frequency (e.g., clock signal from clocking source 402), and to generate a first output (e.g., input to switched-capacitor multiplier 403). In some embodiments, switched-capacitor multiplier 403 is operable to receive the first output and to provide a second output with increased signal strength to baseband filter 404. Baseband filter 404 is to filter a portion of the second output to detect a wakeup signal.

In some embodiments, an amplifier is coupled to switched-capacitor multiplier 403, and is to amplify the second output. In some embodiments, baseband filter 404 is coupled to the amplifier. In some embodiments, baseband filter 404 is integrated with the amplifier (e.g., it is not a separate component, but built-in as part of the baseband filter 404). In some embodiments, switched-capacitor multiplier 403 receives a third signal of a third frequency (e.g., another clock signal from clocking source 402 to control switches of the switched-capacitor multiplier 403). In some embodiments, the frequency of operation of switched-capacitor multiplier 403 can be selected arbitrarily to minimize (e.g., reduce) the folding of interferences.

In some embodiments, the output of baseband filter 404 is converted to a digital representation by analog-to-digital converter (ADC) 405. For example, ADC 405 converts the filtered portion of the second output to a digital representation. In some embodiments, this digital representation may be used to wake-up another receiver (e.g., the main radio) which then processes the incoming wireless signal which has regular data.

ADCs are apparatuses that convert continuous physical quantities (e.g., voltages) to digital numbers that epresent the amplitude of the physical quantities. In some embodiments, ADC 405 converts the analog output of baseband filter 404 to its corresponding digital representation. Any suitable ADC may be used to implement ADC 405. For example, ADC 405 is one of: direct-conversion ADC (for flash ADC), two-step flash ADC, successive-approximation ADC (SAR (Successive Approximation Register) ADC), ramp-compare ADC, Wilkinson ADC, integrating ADC, delta-encoded ADC or counter-ramp, pipeline ADC (also called sub-ranging quantizer), sigma-delta ADC (also known as a delta-sigma ADC), time-interleaved ADC, ADC with intermediate frequency modulation (FM) stage, or time-stretch ADC.

For purposes of explaining the various embodiments, ADC 405 is considered to be 6-bit SAR ADC. In some embodiments, ADC 405 digitizes the analog signal and a digital envelope detector demodulates the incoming signal. In some embodiments, ADC 405 converts an analog signal at 4 Mbps (megabits per second). The output of ADC 405 has as signal-to-noise ratio (SNR) of about 3 dB, for example.

In some embodiments, demodulation is performed in the digital domain using a digital envelope detector 406 based demodulator to exploit the advantages of faster CMOS process nodes (e.g., a 14 nm process of Intel Corporation of Santa Clara Calif.). In some embodiments, digital envelope detector 406 comprises a half-wave or full-wave rectifier that takes a high-frequency signal as input and provides an output which is an envelope of the input signal. However, the embodiments are not limited to a digital envelope detector. In some embodiments, an analog envelope detector can also be utilized. In one such example, the analog envelope detector is positioned before ADC 405, and the output of baseband filter 404 is received by the analog envelope detector. In this case, ADC 405 can be a single bit comparator which compares the output of the analog envelope detector against a threshold level, for example.

In some embodiments, the output of envelope detector 406 is received by a digital decimator actuator 407. One reason for using envelope detector 406 is because OOK is used as a modulation scheme for its low power nature. In some embodiments, envelop detector 406 can be replaced with a different demodulator if a different modulation scheme is used. For example, Minimum Shift Keying (MSK) or Guassian Frequency Shift Keying (GFSK) may be used instead of OOK as the demodulation scheme.

In some embodiments, digital decimator actuator 407 performs digital filtering and decimation to get to the final data rate by reducing the data rate or the size of the data. In some embodiments, digital decimator actuator 407 uses filtering to mitigate aliasing distortion. Any suitable decimator actuator can be used to implement digital decimator actuator 407.

In some embodiments, an analog envelope detector can be also utilized but the system level gain, power, and noise budget has to be re-optimized as the sensitivity of an analog envelope detector is non-linear and degrades quickly for small input signals.

In some embodiments, the output of digital decimator actuator 407 is received by demodulator 408 (e.g., 250 kbps OOK demodulator) and packet acquisition 409. In some embodiments, the single-chain receiver topology of FIG. 4 is adopted for an OOK (On-Off Keying) modulation scheme which may not carry any phase information and can be demodulated with a single-chain receiver. In some embodiments, demodulator 408 receives a modulated data (in this case OOK modulated data, but can be any type) and outputs an unmodulated data stream. In some embodiments, the output from digital decimator actuator 407 is also received by packet acquisition block 409. Packet acquisition block 409 can provide information such as when a packet starts. For example, packet acquisition block 409 can be a correlator unit looking for a particular sequence to understand the start of a packet.

In some embodiments, the output of demodulator 408 is received by packet parser 410. In some embodiments, packet parser 410 provides an output which indicates whether a wake-up signal is present in the incoming packet 220. This wake-up signal is then used to wake-up second radio 201b (e.g., Wi-Fi Radio or main radio) to process incoming data.

The wake-up receiver 400 (e.g., first receiver 201a) consumes lower power than the main radio (e.g., second receiver 201b). For example, the clocking source 402 may consume about 20 μW, the switched-capacitor multiplier 403 and baseband filter 404 together may consume 22 μW, and the remaining circuits may consume about 20 μW given that most circuits are digital circuits that consume little power. In some embodiments, to improve the performance by wake-up receiver (e.g., its ability to detect a wake-up signal), high-Q components may be used.

Figure 5:
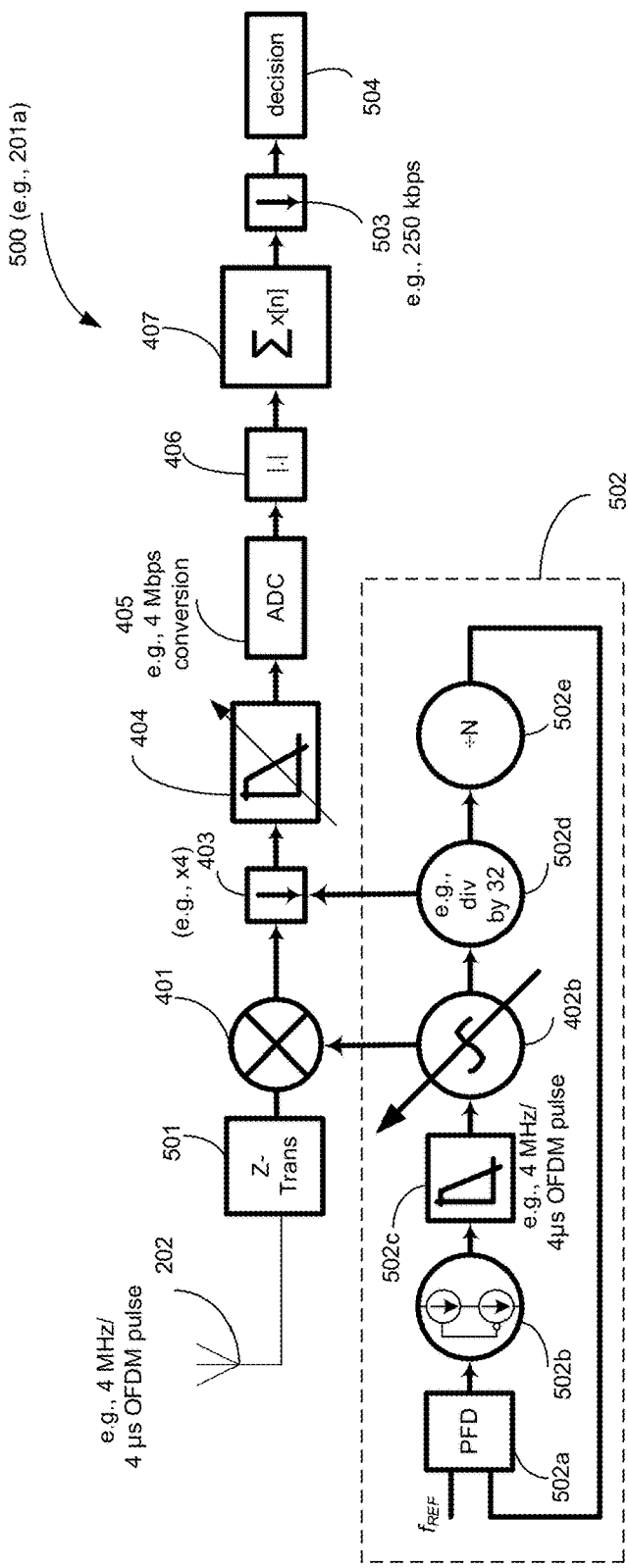
FIG. 5 illustrates a detailed block level diagram of the Wake-up Receiver, in accordance with some embodiments.

FIG. 5 illustrates a detailed block level diagram 500 of the Wake-up Receiver, in accordance with some embodiments. It is pointed out that those elements of FIG. 5 having the same reference numbers (or names) as the elements of any other figure can operate or function in any manner similar to that described, but are not limited to such.

In some embodiments, an on-chip LC (inductor-capacitor) based step-up impedance matching network 501 is utilized to provide matching to antenna 202 and voltage gain before mixer 401 is to mitigate the circuitry noise and enhance the Noise Figure (NF) and sensitivity. For instance, impedance matching network 501 (e.g., expressed as a Z-transformed matrix) provides 50 Ohm matching to antenna's 50 Ohm impedance.

In some embodiments, an inductor with moderate Q (e.g., approximately 15) is used for implementing step-up impedance matching network 501. As such, the need for an external high-Q component can be avoided. Various embodiments are not limited to on-chip inductors. In some embodiments, based on the substrate resistivity and passive quality of the CMOS process, an off-chip inductor (inside or outside the package) can also be utilized for implementing step-up impedance matching network 501. In some embodiments, a 50-ohm resistor can be also used for matching instead of an LC network with the penalty of no voltage gain before the mixer. For example, step-up impedance matching network 501 may be implemented as a 50-ohm resistor or a network of resistors. However, the embodiments are not limited to step-up impedance matching network 501. For example, any type of matching network can be used for implementing impedance matching network 501 so long as the network provides the required impedance matching with antenna 202.

Block level diagram 500 also illustrates an embodiment 502 of clocking source 402. For example, components of PLL 402a as used with oscillator 402b of FIG. 4 are shown. PLL 402a may include a phase frequency detector (PFD) 502a that compares the phase and/or frequency of an incoming reference clock signal (e.g., $f_{REF}$) with a feedback signal generated by divider 502e (e.g., divide-by-N circuit 502e, where 'N' is an integer or fraction depending on the architecture of clocking source 402 of FIG. 4). PLL 402a may further include a charge pump 502b (e.g., a pump-up and pump-down circuit) that is operable to dump or sink charge from a control node depending on the output of PFD 502a. The signal on the control node is then filtered by a low pass filter 502c that provides a filtered output for controlling oscillating frequency of oscillator 402b. In some embodiments, one output of oscillator 402b is used as clocking or mixing signal by mixer 401 while another output of oscillator 402b is received by a first divider 502b. In some embodiments, first divider 502d (e.g., divide-by-32 circuit) generates a clocking signal for switched-capacitor multiplier 403. The output of first divider 502d is then further divided by divider 502e to generate feedback signal for PFD 502a.

In some embodiments, the output of envelop detector 406 is received by a digital decimator implemented by blocks 407 and 503. In some embodiments, the digital decimator has a built-in filter and decimating circuit that together determine the final data rate. Filtering can be implemented with an FIR (Finite-Impulse Response) architecture (e.g., accumulate and dump operations) using digital accumulators as in block 407. Block 407 can receive an N-bit input and can output an M-bit output where 'M' and 'N' are not necessarily the same. The data rates at the input and output can be identical, but may not be necessarily. The final data rate can be achieved using decimator block 503, in accordance with some embodiments. Based on a decimation factor, the output data rate may reduce by this factor compared to the input data rate.

The output of the decimator is then received by a decision circuit 504 that determines whether packet 220 included a wake-up signal. In some embodiments, the decision circuit 504 is implemented as a comparator that compares the output from the decimator with a known reference, and generates a logic high or low signal output indicating the presence or absence of any wake-up signal. Depending on the output of the decision circuit 504, the main radio (e.g., second receiver 201b) is turned-on or kept turned off. As such, the low power wake-up receiver 500 (or 400) can manage power consumption of receiver 201, in accordance with some embodiments.

Figure 6:
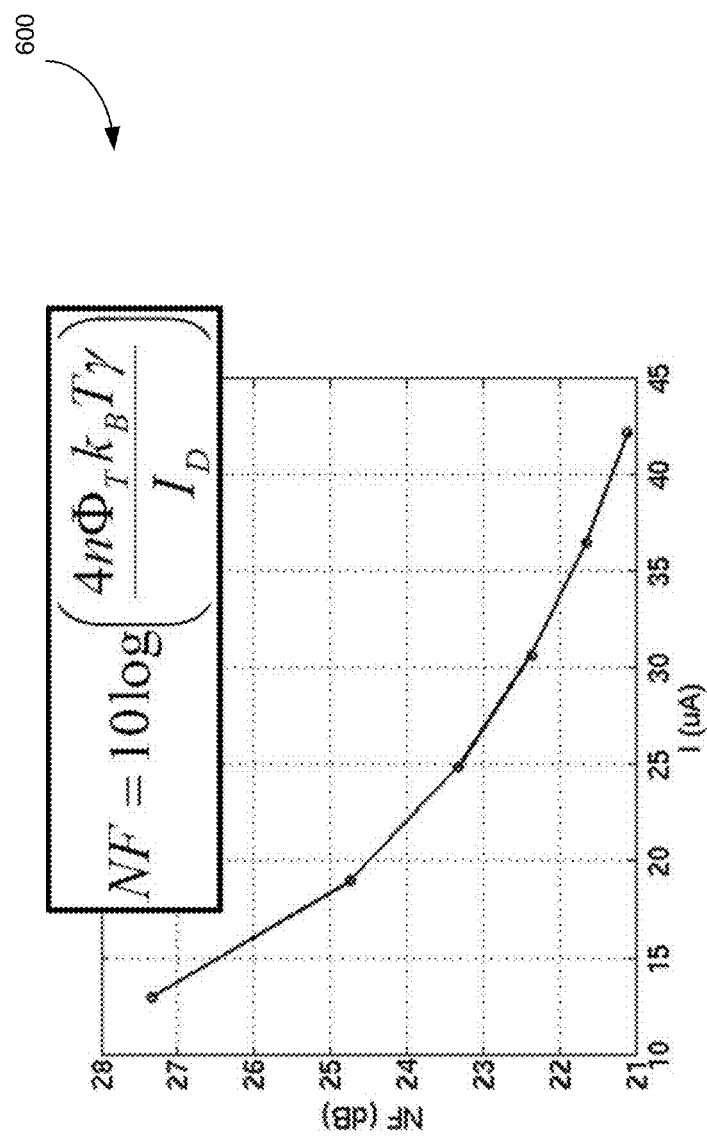
FIG. 6 illustrates a plot showing Noise Figure (NF) versus power dissipation of a transistor.

FIG. 6 illustrates plot 600 showing Noise Figure (NF) versus power dissipation of a transistor. Here, x-axis is current (in μA) and y-axis is NF (in dB). Plot 600 illustrates the trade-off of placing an LNA before mixer 401 (e.g., placing and LNA between antenna 202 and mixer 401) and power consumption, according to one example. A person skilled in the art would appreciate that the numbers along the 'x' and 'y' axes are examples, and can be different for different process technologies and operating parameters. In active amplifiers (e.g., LNA), noise is strongly correlated with the transconductance and hence the power dissipation of the devices in the amplifier. To reduce power dissipation of wake-up receiver 201a while having a low NF, some embodiments use switched-capacitor voltage multiplier 403 after mixer 401 instead of a conventional amplifier. As such, the link between noise and power dissipation can be broken as the noise in switched-capacitor voltage multiplier 403 is defined to the first order by the size of the capacitors in switched-capacitor voltage multiplier 403.

Table 2 below shows the NF vs. power relationship of a low-power LNA (low noise amplifier) architecture for various loading scenarios. It can be seen that at least 30 μA power dissipation may be used for a reasonable load capacitor of 30 fF to get a gain of 5 dB and a NF of 20 dB. As such, removing the LNA and using a mixer-first architecture of various embodiments saves power and area.

TABLE 2

| Benefits of mixer-first architecture of some embodiments compared to LNA | | |
|---|---|---|
| NF | 20 dB | 23 dB |
| Power μA | 30 | 15 |
| Gain | 17 dB/11 dB/5 dB | 8 dB |
| Load (F) | 0f/10f/30f | 0 |

A person skilled in the art would appreciate that the numbers in Table 2 are examples, and depending on the LNA architecture and the process technology, the numbers might vary but may continue to show that with an LNA the power dissipation increases.

Figure 7:
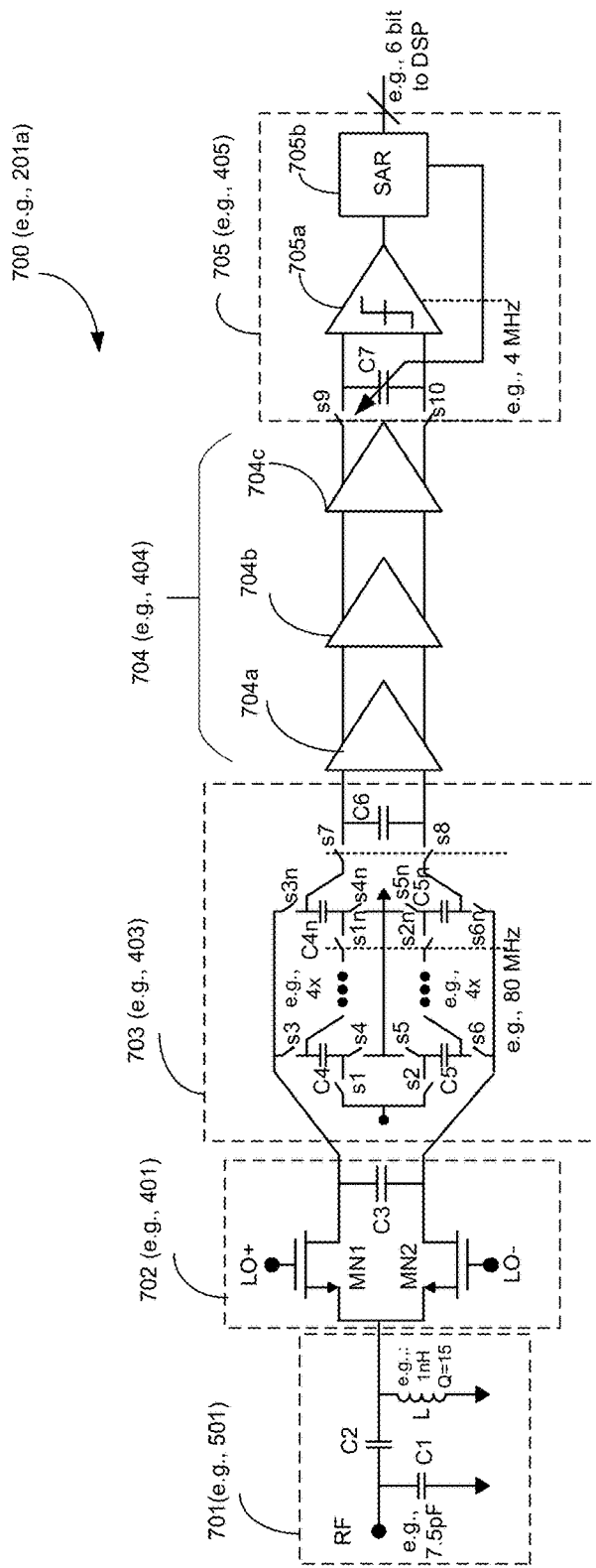
FIG. 7 illustrates a schematic of the Wake-up Receiver, according to some embodiments of the disclosure.

FIG. 7 illustrates schematic 700 (e.g., 201a) of the Wake-up Receiver, according to some embodiments of the disclosure. It is pointed out that those elements of FIG. 7 having the same reference numbers (or names) as the elements of any other figure can operate or function in any manner similar to that described, but are not limited to such.

In some embodiments, impedance matching circuit 701 (e.g., 501) comprises an LC network as shown. In some embodiments, the capacitors of impedance matching circuit 701 are 7.5 pF capacitors while the inductor has inductance of about 1 nH. However, the embodiments are not limited to such, and the capacitance and inductance values can be selected to match impedance of antenna 202.

In some embodiments, mixer 702 (e.g., 401) comprises a first transistor MN1 controllable by a first phase of a clock signal (e.g., LO+), a second transistor MN2 controllable by a second phase of the clock signal (e.g., LO−), and a capacitor C3. In some embodiments, source terminals of the first transistor MN1 and the second transistor MN2 are coupled together and to impedance matching circuit 701. In some embodiments, the drain terminals of the first transistor MN1 and the second transistor MN2 are coupled to capacitor C3. In some embodiments, the drain terminals of the first transistor MN1 and the second transistor MN2 are coupled to the switched-capacitor voltage multiplier 703.

In some embodiments, switched-capacitor voltage multiplier 703 comprises a plurality of switches s1-sn, where 'n' is an integer (e.g., s1, s2, s3, s4, s5, s6. . . s1n, s2n, s3n, s4n, s5n, s6n, s7, and s8) and capacitors coupled together as shown. The switches are implemented as transistors (e.g., pass-gates or transmission gates). The capacitors of the various embodiments can be implemented using any known technology. For example, the capacitors can be implemented using metal layers (e.g., metal capacitors), transistor based capacitors, or a hybrid of them. In some embodiments, the switches (e.g., the gate terminals of transistors behaving as digital switches) are controlled by the clock signal (e.g., 80 MHz) generated by divider 502*d*. In some embodiments, switches s7 and s8 are coupled to capacitor C6 as shown.

In some embodiments, the output(s) of switched-capacitor voltage multiplier 703 is/are coupled to one or more amplifiers 704 (e.g., 404). In some embodiments, active amplifiers follow the switched-capacitor voltage multiplier 703 to provide additional gain and limit the bandwidth of the overall receiver to around 2 MHz. For example, a cascade of three amplifiers 704*a*, 704*b*, and 704*c* coupled together in series are used to implement amplifier 704. However, in other embodiments, other number of amplifiers may be used. In some embodiments, the one or more amplifiers 704 are differential amplifiers. In other embodiments, the one or more amplifiers 704 are single-ended amplifiers.

In some embodiments, ADC 705 (e.g., 405) is coupled to the output of one or more amplifiers 704. ADC 705 can be a capacitive SAR ADC 705*a* with a sampling network including switches s9 and s10 to sample the output of the last amplifier/filter/buffer stage (e.g., 704*c*). The capacitor C7 can be a capacitive DAC of the SAR ADC with a feedback from SAR logic 705*b*. A person skilled in the art would appreciate that any type of ADC can be utilized for ADC 705 without violating the generality of the embodiments. In this example, the output of ADC 705 is a 6-bit output which is then sent to a processing logic (e.g., digital signal processor (DSP)) for further processing.

Figure 8:
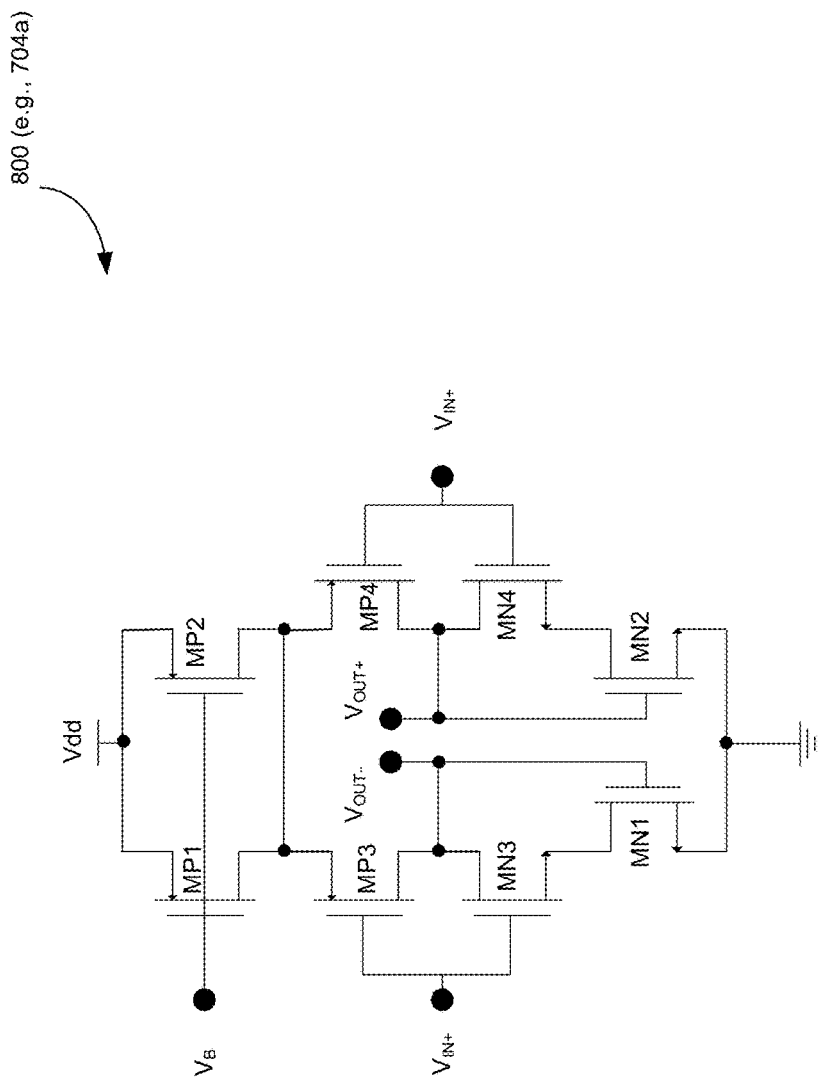
FIG. 8 illustrates a schematic of the first amplifier stage of the Wake-up Receiver, according to some embodiments of the disclosure.

FIG. 8 illustrates schematic 800 of the first amplifier stage 704*a* of Wake-up Receiver 201*a*, according to some embodiments of the disclosure. In some embodiments, first amplifier stage 704*a* comprises p-type transistors MP1, MP2, MP3, MP4, and n-type transistors MN1, MN2, MN3, and MN4 coupled together as shown. Here, transistors MP1 and MP2 are current sources that are biased by $V_B$, transistors MP3 and MN3 receive the first part of differential input $V_{IN+}$, and transistors MP4 and MN4 receive a second part of differential input $V_{IN-}$. In some embodiments, transistors MN1 and MN2 are self-biased and together with transistors MP3, MN3, MP4, and MN4 provide the differential output $V_{OUT-}$ and $V_{OUT+}$.

In some embodiments, first amplifier stage 704*a* provides gain to increase the desired signal amplitude and also provides filtering. Here, first amplifier stage 704*a* is implemented as an open-loop amplifier with self-biasing common mode feedback but any amplifier architecture can be used. The filtering can be achieved by the dominant pole at the output of the amplifier stage. Any type of filtering can be implemented using active/passive components in open-loop/closed-loop topologies, for example.

Figure 9:
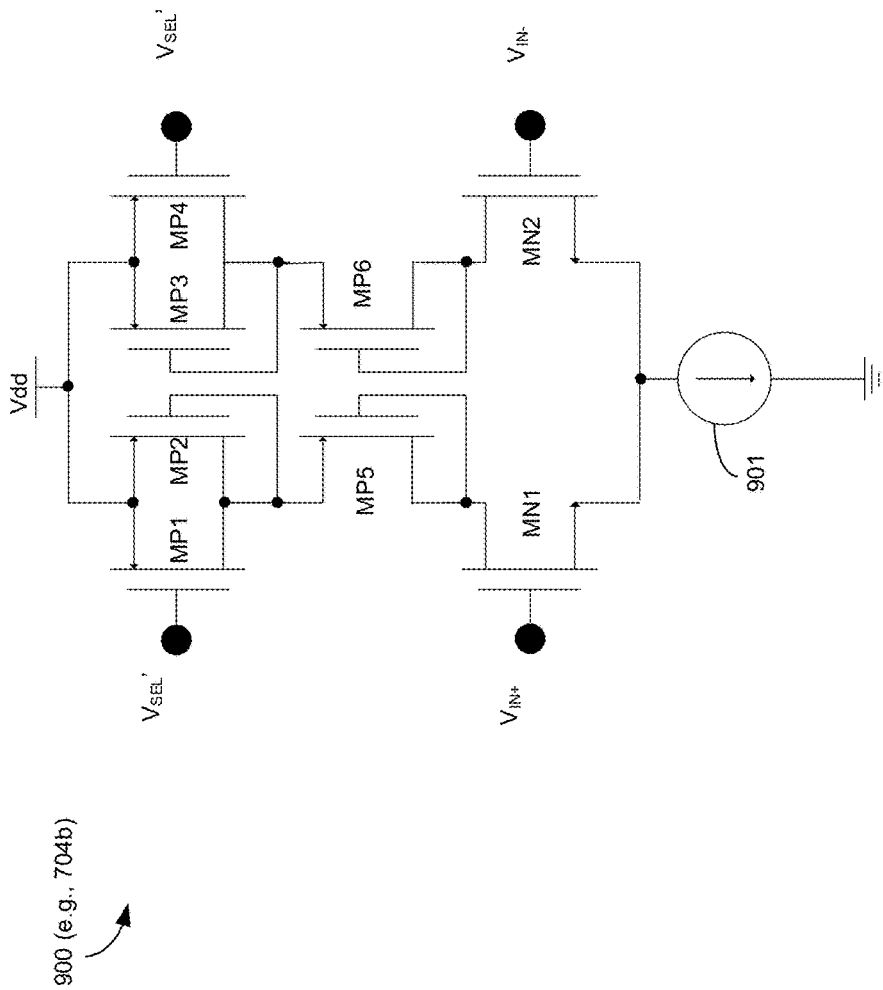
FIG. 9 illustrates a schematic of the second amplifier stage of the Wake-up Receiver, according to some embodiments of the disclosure.

FIG. 9 illustrates schematic 900 of second amplifier stage 704*b* of Wake-up Receiver 201*a*, according to some embodiments of the disclosure. In some embodiments, second amplifier stage 704*b* comprises p-type transistors MP1, MP2, MP3, MP4, MP5, and MP6; n-type transistors MN1 and MN2, and current source 901 coupled together as shown. In some embodiments, the differential output $V_{OUT-}$ and $V_{OUT+}$ of first amplifier stage 704*b* is coupled to differential input $V_{IN+}$ and $V_{IN-}$, respectively, of second amplifier stage 704*b*. In some embodiments, the outputs are the drain terminals of the n-type transistors MN1 and MN2.

In some embodiments, the gain of second amplifier stage 704*b* is strongly correlated with the transconductance ratios of the n-type and p-type devices. Compared to first amplifier stage 704*a*, second amplifier stage 704*b* may provide lower gain, in accordance with some embodiments. In some embodiments, similar filtering as in first amplifier stage 704*a* can be achieved in second amplifier stage 704*b* with a dominant pole at the output. In some embodiments, a variable gain can be achieved using the $V_{SEL'}$ signals. The embodiments are not limited to this type of amplifier design for second amplifier stage 704*b*, and any particular amplifier/filter block can be used.

Figure 10:
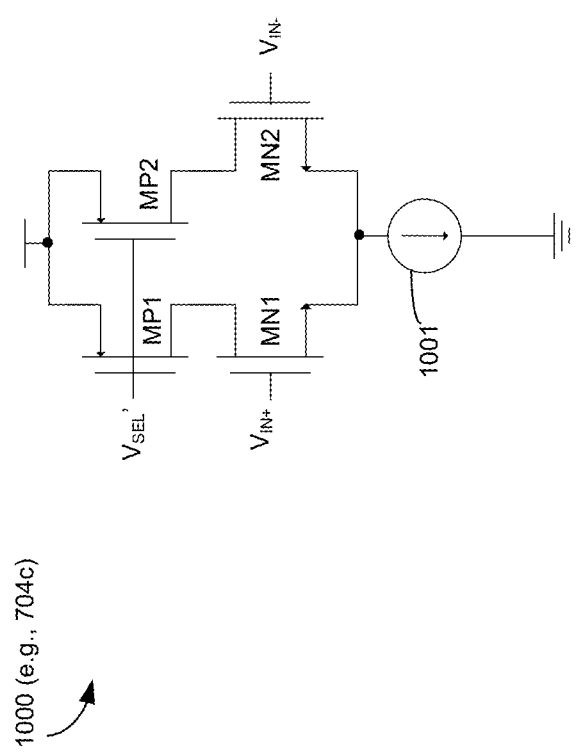
FIG. 10 illustrates a schematic of the third amplifier stage of the Wake-up Receiver, according to some embodiments of the disclosure.

FIG. 10 illustrates schematic 1000 of third amplifier stage 704*c* of Wake-up Receiver 201*a*, according to some embodiments of the disclosure. In some embodiments, third amplifier stage 704*c* comprises p-type transistors MP1 and MP2; n-type transistors MN1 and MN2, and current source 1001 coupled together as shown. The output of second amplifier stage 704*b* is received as input $V_{IN+}/V_{IN-}$ to third amplifier stage 704*c*. In some embodiments, the outputs are the drain terminals of the n-type transistors MN1 and MN2. In some embodiments, third amplifier stage 704*c* is an open-loop differential pair with active load. In some embodiments, $V_{SEL'}$ signal is used to adjust the gain third amplifier stage 704*c* when variable gain function is desired. In some embodiments, like other amplifier stages, third amplifier stage 704*c* can also provide filtering due to its dominant pole at the output.

Figure 11:
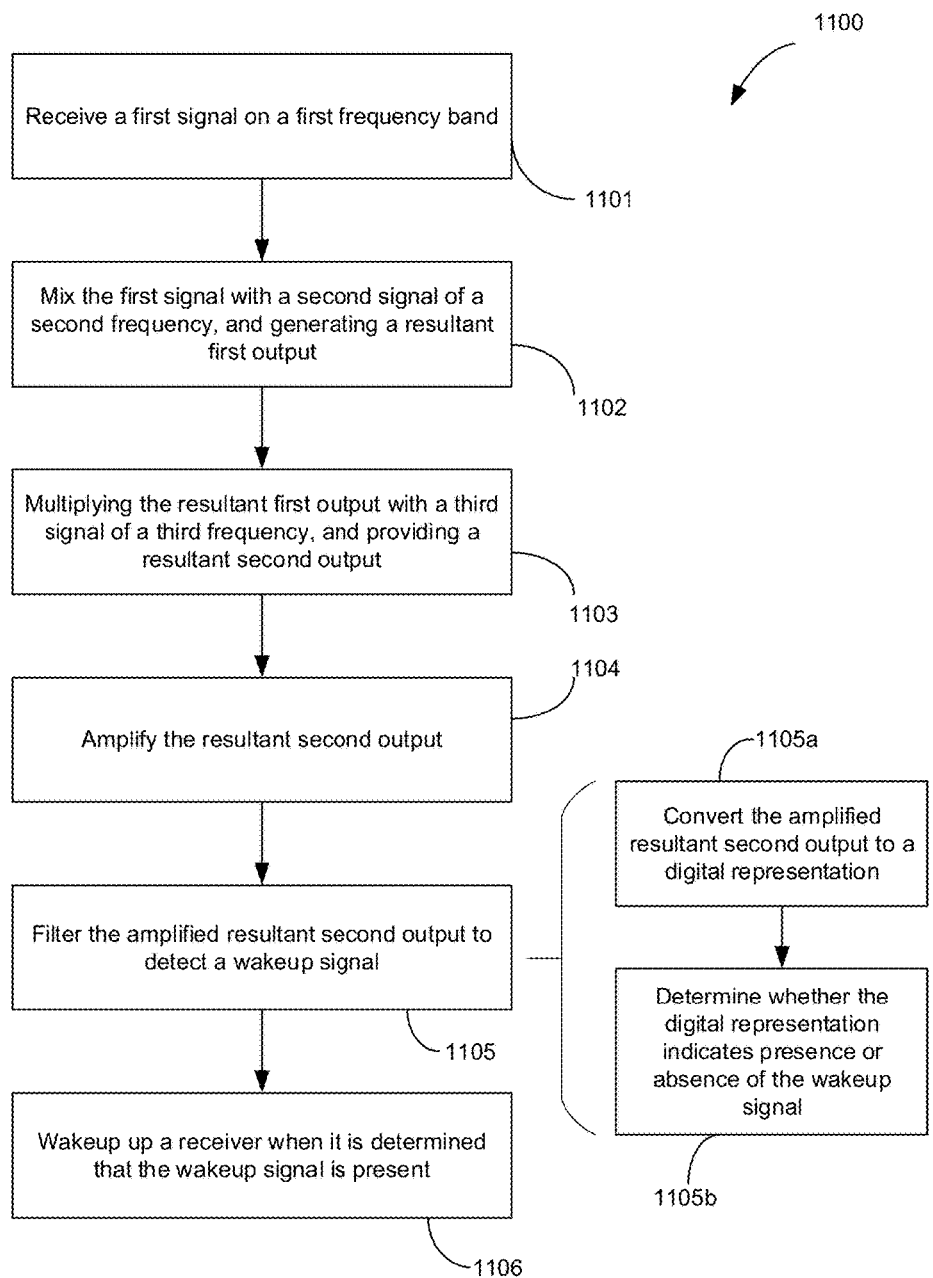
FIG. 11 illustrates a flowchart of a method for detecting the wake-signal, according to some embodiments of the disclosure.

FIG. 11 illustrates flowchart 1100 of the method for detecting the wake-signal, according to some embodiments of the disclosure. It is pointed out that those elements of FIG. 11 having the same reference numbers (or names) as the elements of any other figure can operate or function in any manner similar to that described, but are not limited to such. Although the blocks in the flowchart with reference to FIG. 11 are shown in a particular order, the order of the actions can be modified. Thus, the illustrated embodiments can be performed in a different order, and some actions/blocks may be performed in parallel. Some of the blocks and/or operations listed in FIG. 11 are optional in accordance with certain embodiments. The numbering of the blocks presented is for the sake of clarity and is not intended to prescribe an order of operations in which the various blocks must occur. Additionally, operations from the various flows may be utilized in a variety of combinations.

At block 1101, antenna 202 receives a first signal on a first frequency band (e.g., an RF signal carrying the wake-up signal). At block 1102, mixer 401 mixes the first signal with a second of a second frequency (e.g., a clocking signal or local oscillating (LO) signal from clocking source 402). At block 1103, switched-capacitor voltage multiplier multiplies the resultant first output from mixer 401 with a third signal of a third frequency (another clocking signal from clocking source 402), and generates a resultant second output. In some embodiments, at block 1104, the second output is amplified by an amplifier and then filtered by baseband filter 404 to detect the wake-up signal. In some embodiments, the process of detect the wake-up signal comprises performing the processes of 1105*a* and 1105*b*.

At block 1105*a*, the amplified second output is converted by ADC 405 to a digital representation. At block 1105*b*, a logic (e.g., decision circuit 504) determines whether the digital representation indicates presence or absence of the wakeup signal. Depending on that determination, the main radio (e.g., second receiver 201*b*) is activated. For example, at block 1106, when it is determined that the wake-up signal is detected, then a control signal is generated which powers up the main radio (e.g., second receiver 201*b*) from a sleep state to an active state to process incoming data on antenna 202.

Figure 12:
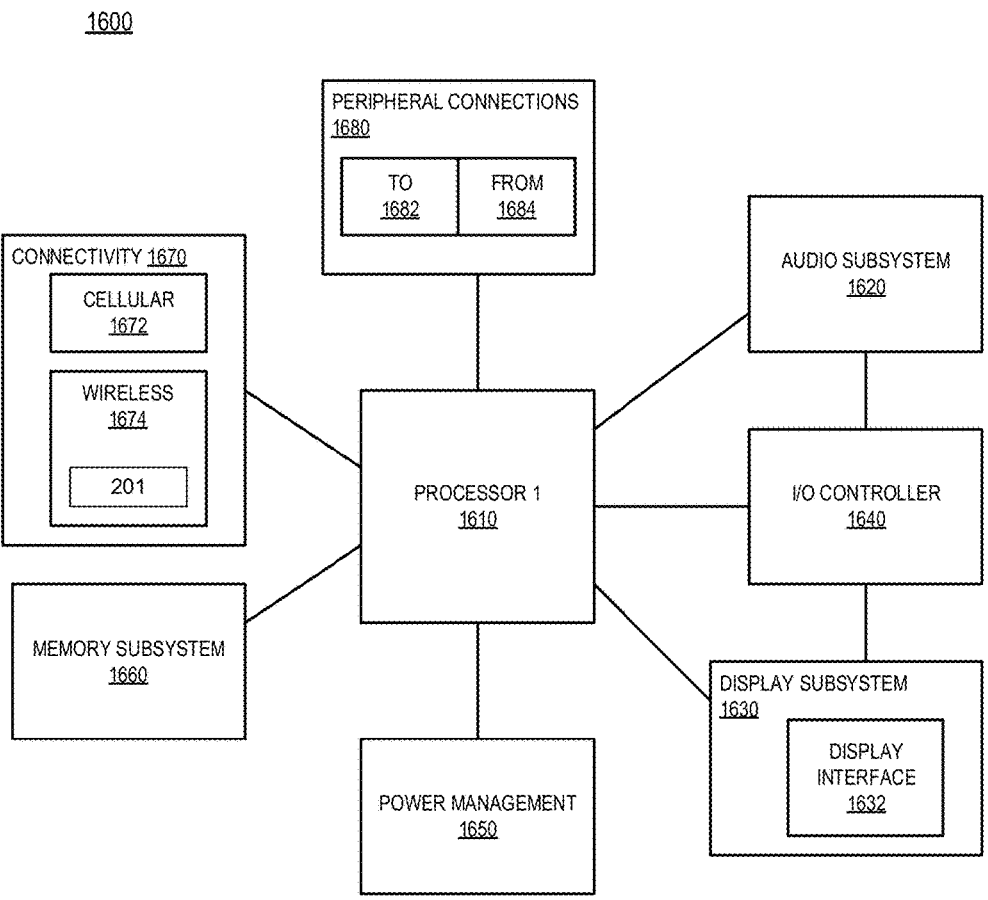
FIG. 12 illustrates a smart device or a computer system or a SoC (System-on-Chip) with a fully integrated wake-up receiver, according to some embodiments.

FIG. 12 illustrates a smart device or a computer system or a SoC (System-on-Chip) 1600 with a fully integrated wake-up receiver, according to some embodiments. It is pointed out that those elements of FIG. 12 having the same reference numbers (or names) as the elements of any other figure can operate or function in any manner similar to that described, but are not limited to such.

FIG. 12 illustrates a block diagram of an embodiment of a mobile device in which flat surface interface connectors could be used. In some embodiments, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In some embodiments, computing device 1600 includes first processor 1610 with a fully integrated wake-up receiver, according to some embodiments discussed. Other blocks of the computing device 1600 may also include a fully integrated wake-up receiver, according to some embodiments. The various embodiments of the present disclosure may also comprise a network interface within 1670 such as a wireless interface so that a system embodiment may be incorporated into a wireless device, for example, cell phone or personal digital assistant.

Some embodiments may be used in conjunction with devices and/or networks operating in accordance with standard wireless communications technologies such as devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN (Local Area Network) Medium Access Control (MAC) and Physical Layer (PHY) Specifications, Mar. 29, 2012; IEEE802.11 task group ac (TGac) ("IEEE802.11-09/0308r12—TGac Channel Model Addendum Document"); IEEE 802.11 task group ad (TGad) (IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 Dec., 2012)) and/or future versions and/or derivatives thereof, existing Wireless-Gigabit-Alliance (WGA) specifications (Wireless Gigabit Alliance, Inc WiGig MAC and PHY Specification Version 1.1, April 2011) and/or future versions and/or derivatives thereof, existing WirelessHD' specifications, and/or future versions and/or derivatives thereof, existing and/or Wireless Fidelity (Wi-Fi) Alliance (WFA) Peer-to-Peer (P2P) specifications (Wi-Fi P2P technical specification, version 1.3 2012), and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

Some embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

The term "wireless" here may be generally used to describe circuits, communications channels devices, methods, systems, techniques, etc., that communicate data by with modulated electromagnetic emission through a non-solid medium. The term "wireless device" here, includes, for example, a device capable of wireless communication, a communication device capable of wireless communication, a communication station capable of wireless communication, a portable or non-portable device capable of wireless communication, or the like. In some embodiments, a "wireless device" may be or may include a peripheral that is integrated with a computer, or a peripheral that is attached to a computer.

In some embodiments, the term "wireless device" may optionally include a wireless service. A wireless device, in some embodiments, may comprise at least one antenna, at least one radio, at least one memory, and at least one processor, where the radio(s) transmits signals through the antenna that represent data and receives signals through the antenna that represent data, while the processor(s) may process the data to be transmitted and/or the data that has been received. The processor(s) may also process other data which is neither transmitted nor received. The term "communicate" is generally intended to include the actions or means of transmitting, or receiving, or both transmitting and receiving. The bidirectional exchange of data between two devices (e.g., both devices transmit and receive during the exchange) may also be described as 'communicating', when merely the functionality of one of those devices is being claimed.

The term "communicating" as used here with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

In some embodiments, processor 1610 (and/or processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In some embodiments, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

In some embodiments, computing device 1600 comprises display subsystem 1630. Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

In some embodiments, computing device 1600 comprises I/O controller 1640. I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In some embodiments, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In some embodiments, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, computing device 1600 comprises connectivity 1670. Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication. In some embodiments, Cellular connectivity 1672 includes a fully integrated wake-up receiver. In some embodiments, the wireless connectivity includes a fully integrated wake-up receiver.

In some embodiments, computing device 1600 comprises peripheral connections 1680. Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, an apparatus is provided which comprises: a mixer to mix a first signal of a first frequency with a second signal of a second frequency, and to generate a first output; a switched-capacitor multiplier, coupled to the mixer, to receive the first output and to provide a second output with reduced noise; and an amplifier, coupled to the switched-capacitor multiplier, to amplify the second output. In some embodiments, the apparatus comprises an impedance matching network having an impedance matched with an impedance of an antenna, wherein the impedance matching network is coupled to the mixer and is to provide the first signal to the mixer. In some embodiments, the mixer is a passive mixer.

In some embodiments, the apparatus comprises a clock source to provide the second signal to the mixer and to provide a third signal of a third frequency to the switched-capacitor multiplier. In some embodiments, the clock source is one of a frequency locked loop (FLL) or a phase locked loop (PLL). In some embodiments, the apparatus comprises a filter coupled to the amplifier, wherein the filter is to filter a portion of the second output to detect a wakeup signal. In some embodiments, the apparatus comprises a filter integrated with the amplifier, wherein the filter is to filter a portion of the second output to detect a wakeup signal. In some embodiments, the apparatus comprises an analog-to-digital converter (ADC) coupled to the filter, wherein the ADC is to convert the filtered portion of the second output to a digital representation.

In some embodiments, the apparatus comprises: an envelope detector coupled to the ADC; a digital decimator and accumulator coupled to the envelope detector; and a decision circuit coupled to the digital decimator and accumulator, wherein the decision circuit is to generate a control signal according to whether a wakeup signal is detected. In some embodiments, the apparatus comprises a low noise amplifier (LNA) coupled to the mixer, wherein the LNA is to provide the first signal to the mixer. In some embodiments, the apparatus a baseband logic (e.g., blocks 406, 407, 408, 409, and 410 of FIG. 4) coupled to the ADC. In some embodiments, the baseband logic comprises: an envelope detector coupled to the ADC; a digital decimator and accumulator coupled to the envelope detector; and a decision circuit coupled to the digital decimator and accumulator, wherein the decision circuit is to generate a control signal according to whether a wakeup signal is detected.

In another example, an apparatus is provided which comprises: an antenna; a first receiver, coupled to the antenna, to detect a wakeup signal from a portion of a first frequency band, wherein the portion is between edges of the first frequency band; and a second receiver, coupled to the first receiver, the second receiver is to receive a control signal from the first receiver according to whether the wakeup signal is detected. In some embodiments, the first receiver is always-on or duty-cycled, and wherein the second receiver is operable to turn on and off according to the control signal. In some embodiments, the first receiver comprises: a mixer to mix a first signal with a second signal of a second frequency, and to generate a first output; a switched-capacitor multiplier, coupled to the mixer, to receive the first output and to provide a second output with reduced noise; and an amplifier, coupled to the switched-capacitor multiplier, to amplify the second output.

In some embodiments, the apparatus comprises an impedance matching network having an impedance matched with an impedance of an antenna, wherein the impedance matching network is coupled to the mixer and is to provide the first signal to the mixer. In some embodiments, the first receiver is to receive a clock signal from a clock source that uses an existing clock of a platform instead from a crystal, and wherein the clock source is to provide the second signal to the mixer and to provide a third signal of a third frequency to the switched-capacitor multiplier. In some embodiments, the clock source is one of a frequency locked loop (FLL) or a phase locked loop (PLL). In some embodiments, the first frequency band is 20 MHz and wherein the portion of the frequency band is 4 MHz.

In some embodiments, the first receiver is a mixer-first topology without a low noise amplifier (LNA). In some embodiments, the first and second receivers share a baseband logic. In some embodiments, the first receiver comprises a filter integrated with the amplifier; and an analog-to-digital converter (ADC) coupled to the filter, wherein the baseband logic comprises: an envelope detector coupled to the ADC; a digital decimator and accumulator coupled to the envelope detector; and a decision circuit coupled to the digital decimator and accumulator, wherein the decision circuit is to generate a control signal according to whether a wakeup signal is detected.

In another example, a system is provided which comprises: a memory; an antenna; and a processor coupled to the memory, the processor including: a first receiver, coupled to the antenna, to detect a wakeup signal from a portion of a first frequency band, wherein the portion is between edges of the first frequency band; and a second receiver, coupled to the first receiver, the second receiver is to receive a control signal from the first receiver according to whether the wakeup signal is detected.

In some embodiments, the first receiver is always-on or duty-cycled, and wherein the second receiver is operable to turn on and off according to the control signal. In some embodiments, the first receiver comprises: a mixer to mix a first signal with a second signal of a second frequency, and to generate a first output; a switched-capacitor multiplier, coupled to the mixer, to receive the first output and to provide a second output with reduced noise; and an amplifier, coupled to the switched-capacitor multiplier, to amplify the second output.

In another example, an apparatus is provided which comprises: an antenna; a first receiver which is always-on, the first receiver is to detect a wakeup signal embedded in a packet received by the antenna; and a second receiver which is operable to turn on and off, the second receiver is to receive a control signal from the first receiver to wake-up the second receiver. In some embodiments, the first receiver complies with a standard wireless specification. In some embodiments, the first receiver is operable to detect the wakeup signal embedded substantially in the middle of a frequency band of the packet.

In some embodiments, the first receiver has a mixer-first topology without an LNA. In some embodiments, the first receiver includes a switched-capacitor multiplier to lower the noise, and wherein the switched-capacitor multiplier is coupled to a mixer of the mixer-first topology. In some embodiments, the mixer is a passive mixer. In some embodiments, the apparatus comprises a filter coupled to the switched-capacitor multiplier, the filter is to filter an output of the switched-capacitor multiplier to extract the wakeup signal.

In some embodiments, the apparatus comprises an analog-to-digital converter (ADC) coupled to the switched-capacitor multiplier, the ADC is to convert the wakeup signal to a digital representation. In some embodiments, the ADC is a SAR based ADC. In some embodiments, the filter is to perform a filtering operation at baseband. In some embodiments, the first receiver is to receive a clock signal from a source that uses an existing clock of a platform instead from a crystal.

In another example, a method is provided which comprises: receiving a first signal on a first frequency band; mixing the first signal with a second signal of a second frequency, and generating a resultant first output; multiplying the resultant first output with a third signal of a third frequency, and providing a resultant second output; amplifying the resultant second output; and filtering the amplified resultant second output to detect a wakeup signal. In some embodiments, the method comprises converting the amplified resultant second output to a digital representation. In some embodiments, the method comprises determining whether the digital representation indicates presence or absence of the wakeup signal. In some embodiments, the method comprises waking up a receiver when it is determined that the wakeup signal is present.

In another example, an apparatus is provided which comprises: means for receiving a first signal on a first frequency band; means for mixing the first signal with a second signal of a second frequency, and generating a resultant first output; means for multiplying the resultant first output with a third signal of a third frequency, and providing a resultant second output; means for amplifying the resultant second output; and means for filtering the amplified resultant second output to detect a wakeup signal. In some embodiments, the apparatus comprises means for converting the amplified resultant second output to a digital representation. In some embodiments, the apparatus comprises means for determining whether the digital representation indicates presence or absence of the wakeup signal. In some embodiments, the apparatus comprises means for waking up a receiver when it is determined that the wakeup signal is present.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
a mixer to mix a first signal of a first frequency with a second signal of a second frequency, and to generate a first output;
a switched-capacitor multiplier coupled to the mixer, wherein the switched-capacitor multiplier is to receive the first output and to provide a second output with reduced noise; and
an amplifier coupled to the switched-capacitor multiplier, wherein the amplifier is to amplify the second output.

2. The apparatus of claim 1 comprises an impedance matching network having an impedance matched with an impedance of an antenna, wherein the impedance matching network is coupled to the mixer and is to provide the first signal to the mixer.

3. The apparatus of claim 1, wherein the mixer is a passive mixer.

4. The apparatus of claim 1 comprises a clock source to provide the second signal to the mixer and to provide a third signal of a third frequency to the switched-capacitor multiplier.

5. The apparatus of claim 4, wherein the clock source is one of a frequency locked loop (FLL) or a phase locked loop (PLL).

6. The apparatus of claim 1 comprises a filter coupled to the amplifier, wherein the filter is to filter a portion of the second output to detect a wakeup signal.

7. The apparatus of claim 1 comprises a filter integrated with the amplifier, wherein the filter is to filter a portion of the second output to detect a wakeup signal.

8. The apparatus of claim 6 comprises an analog-to-digital converter (ADC) coupled to the filter, wherein the ADC is to convert the filtered portion of the second output to a digital representation.

9. The apparatus of claim 8 comprises:
an envelope detector coupled to the ADC;
a digital decimator and accumulator coupled to the envelope detector; and
a decision circuit coupled to the digital decimator and accumulator, wherein the decision circuit is to generate a control signal according to whether a wakeup signal is detected.

10. The apparatus of claim 1 comprises a low noise amplifier (LNA) coupled to the mixer, wherein the LNA is to provide the first signal to the mixer.

11. The apparatus of claim 8 comprises a baseband logic coupled to the ADC.

12. The apparatus of claim 11, wherein the baseband logic comprises:
an envelope detector coupled to the ADC;
a digital decimator and accumulator coupled to the envelope detector; and
a decision circuit coupled to the digital decimator and accumulator, wherein the decision circuit is to generate a control signal according to whether a wakeup signal is detected.

* * * * *